Sept. 22, 1931.  E. R. FITCH  1,824,013
DOUBLE CHECK VALVE DEVICE
Filed Aug. 21, 1930
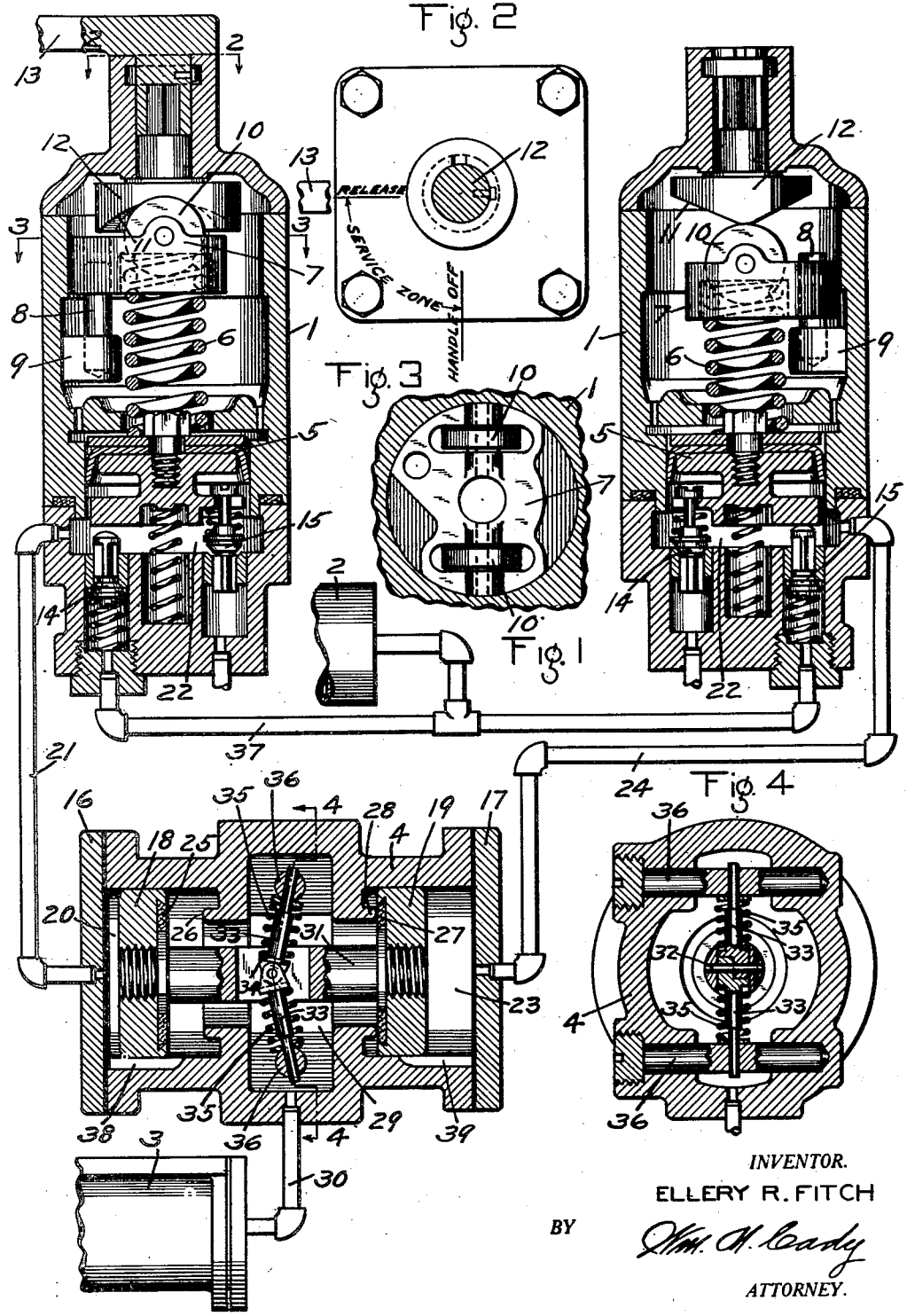
INVENTOR.
ELLERY R. FITCH
BY
*Wm. H. Cady*
ATTORNEY.

Patented Sept. 22, 1931

1,824,013

UNITED STATES PATENT OFFICE

ELLERY R. FITCH, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOUBLE CHECK VALVE DEVICE

Application filed August 21, 1930. Serial No. 476,783.

This invention relates to fluid pressure brakes, and more particularly to a double check valve device adapted to be employed in connection with a fluid pressure brake equipment.

It has been proposed to employ the so-called automatic lapping brake valve device in a fluid pressure brake equipment. This type of brake valve device comprises a spring adapted to be compressed so as to exert pressure on a movable abutment, by the operation of the brake valve handle. When the spring exerts pressure on the abutment, the abutment is moved so as to unseat a fluid pressure supply valve and thereby effect the supply of fluid under pressure to the brake cylinder. The pressure of fluid supplied the brake cylinder acts on the movable abutment in opposition to the spring pressure and when the brake cylinder pressure has been increased to a degree slightly exceeding the pressure of the spring, the abutment is operated to permit the supply valve to close.

In a double end brake equipment, where a brake valve device is provided at each end of the car, when the operator leaves one end of the car to go to the other end, he removes the brake valve handle, in handle off position. This position is the brake application position, so that the brakes must be applied when the operator leaves one end of the car with the brake valve handle.

A double check valve device is interposed in the piping from the brake valve devices to the brake cylinder. The double check valve device is such that the pressure of fluid supplied from the brake valve device at the non-operating end of the car holds the double check valve in position to establish communication from the operating brake valve to the brake cylinder.

When the operator leaves the operating end and removes the brake valve handle, fluid under pressure is supplied to the brake cylinder from this end of the car past the double check valve. When the operator applies the handle to the brake valve device at the other end of the car, and moves the brake valve to release position, the pipe leading to the double check valve is vented to the atmosphere, permitting the pressure of fluid acting on the double check valve as supplied from the end of the car which the operator has just left, to shift the double check valve, so that communication is established at the new operating end of the car from the brake cylinder to the brake valve device.

If brake valve devices of the automatic lapping type are employed, there is liable to be differences in the pressure developed by different automatic lapping brake valves, on account of manufacturing variations and the difficulty in adjusting both brake valve devices to develop the same brake cylinder pressure.

As a result, if the non-operative brake valve device should develop a pressure slightly below that of the operative brake valve, then the higher pressure developed at the operative brake valve may shift the double check valve, against the pressure developed on the double check valve by the non-operative brake valve, so that communication will be established from the operative side of the double check valve to the non-operative side, with the result that fluid under pressure supplied to the double check valve from the brake valve device will flow to the brake valve device at the non-operative end, and will be vented to the atmosphere by the operation of the brake valve device at the non-operative end.

The principal object of my invention is to provide a double check valve device of the above type, in which a differential pressure is automatically set up for preventing the movement of the double check valve from its intended operating positions, even though the pressure developed by one brake valve device be less than the pressure developed by the other brake valve device.

In the accompanying drawings; Fig. 1 is a diagrammatic view, partly in section, of a fluid pressure brake equipment including a double check valve device embodying my invention; Fig. 2 a section on the line 2—2 of Fig. 1; Fig. 3 a section on the line 3—3 of Fig. 1; and Fig. 4 a section on the line 4—4 of Fig. 1.

As shown in Fig. 1, the equipment is of the double end type having a brake valve device 1, at each end of the car, a main reservoir 2, a brake cylinder 3, and a double check valve device 4.

Each brake valve device 1 comprises a casing in which is mounted a piston 5. A coil spring 6 acts on one side of said piston and carried at the upper end of said spring is a pressure plate 7, which is held against rotation by a pin 8, secured to a lug 9, and slidably engaging in a hole in the plate. The plate 7 carries a pair of oppositely disposed rollers 10 adapted to engage the cam face 11 of a rotatable member 12. A handle 13 is operatively connected to the member 12.

The movement of the piston 5 is adapted to operate a fluid pressure supply valve 14 and a release valve 15.

The double check valve device 4 comprises a casing having end cover plates 16 and 17 and containing a double check valve comprising pistons 18 and 19. The chamber 20 at the outer face of piston 8 is connected to pipe 21, leading to the chamber 22 of the left hand brake valve device, and the chamber 23 at the outer face of the piston 19 is connected to a pipe 24 leading to the chamber 20 of the right hand brake valve device.

A seat ring 25 carried by piston 18 is adapted to engage an annular seat rib 26 when piston 18 is moved to the right, and a seat ring 27, carried by piston 19 is adapted to engage a seat rib 28, when piston 19 is moved from its outer to its inner position.

The central chamber 29, formed intermediate the seat ribs 26 and 28 is connected by pipe 30 to the brake cylinder 3.

The piston heads 18 and 19 are connected together by a piston rod 31. Pivotally connected to the central portion of the rod 31 by a pin 32 are members 33, each provided with a collar 34, on which a coil spring 35 seats. The outer end portion of each member slidably extends through a hole provided in a rotatable pin 36, said pins being mounted in bearings provided in the check valve casing.

The springs 35 are under initial compression and when the pistons 18 and 19 are in the left hand position, as shown in Fig. 1, the springs resist movement of the piston rod 31 and said pistons toward the right. If the pistons are moved toward the right from the position shown in Fig. 1 until the members 33 cross over the center line connecting the pins 36, then the angularity of the members 33 is changed, so that the springs then tend to move the pistons toward the right. The springs then operating to oppose movement of the pistons from the right hand position toward the left.

Assuming the parts positioned as shown in Fig. 1, with the operating brake valve at the left, when it is desired to apply the brakes, the handle 13 is rotated, so that the cam member is rotated and the rollers 10 are depressed by the action of the cam face 11, to the extent corresponding with the degree of rotation of the handle 13.

The spring 6 is thus compressed to a corresponding extent and exerts pressure on piston 5. The piston 5 is then moved so as to first permit the release valve 15 to seat and then engage the stem of the supply valve 14 so as to unseat same.

Fluid under pressure is then supplied from pipe 37 and the main reservoir 2, to chamber 22, and flows thence to pipe 21 and piston chamber 20 of the double check valve device. In the outer position of piston head 18, a groove 38 establishes communication from chamber 20 to the opposite side of the piston and communication being open to chamber 29, fluid flows from piston chamber 20 to chamber 29 and thence to the brake cylinder 3.

When the pressure of fluid supplied to chamber 22 and the brake cylinder has been increased to a degree slightly exceeding the pressure of spring 6, the piston 5 will be moved upwardly, so as to permit the valve 14 to seat and cut off the further supply of fluid to the brake cylinder.

The handle having been removed from the non-operating brake valve device at the right of Fig. 1, with the parts in full service application position, the non-operating brake valve at the time of changing ends, operated to supply fluid under pressure to the pipe 24 and the pressure in chamber 23 is maintained to correspond with the compression of spring 6, and this pressure acts on the piston 19 and tends to hold same in its seated position.

If the pressure developed by operation of the brake valve at the left should exceed the pressure developed by the brake valve at the right, the pistons will not be shifted to the right with my improvement, since the action of the springs 35 oppose the movement of the pistons toward the right. The differential pressure due to the springs, will overcome any possible difference in pressures developed by the brake valve devices and will thus prevent the unseating of the piston 19 by the pressure developed by operation of the brake valve device at the left of Fig. 1.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:—

1. A double check valve device comprising connected valve heads movable in one direction by fluid under pressure and movable in the opposite direction by fluid under pressure and a yielding resistance device for initially opposing movement of said valve heads in either direction of movement.

2. A double check valve device comprising valve pistons movable in one direction by fluid under pressure supplied to one valve piston and movable in the opposite direction by fluid under pressure supplied to the other valve piston and a yielding resistance device having an angular position for opposing movement of said pistons in one direction and movable to another angular position for opposing movement of said pistons in the opposite direction.

3. A double check valve device comprising valve pistons movable in one direction by fluid under pressure supplied to one valve piston and movable in the opposite direction by fluid under pressure supplied to the other valve piston and a spring operatively connected to said pistons and movable with said pistons to different angular positions on opposite sides of a neutral line, to yieldingly oppose movement of said pistons in one direction in one angular position and to yieldingly oppose movement of said pistons in the opposite direction in another angular position.

4. In a fluid pressure brake apparatus, the combination with a brake cylinder and two brake valve devices each operative to supply fluid under pressure to the brake cylinder, of a double check valve device comprising connected valve pistons, operated by fluid under pressure supplied by either brake valve to positions for establishing communication from the other brake valve to the brake cylinder, and a yielding resistance means for opposing movement of said double check valve from either of its positions.

5. In a fluid pressure brake apparatus, the combination with a brake cylinder and two brake valve devices each operative to supply fluid under pressure to the brake cylinder, of a double check valve device comprising connected valve pistons, operated by fluid under pressure supplied by either brake valve to positions for establishing communication from the other brake valve to the brake cylinder, and a yielding resistance means having an angular position in which said means opposes movement of said double check valve from one position and movable to another angular position in which said means opposes movement of said double check valve from its other position.

In testimony whereof I have hereunto set my hand, this 16th day of August, 1930.

ELLERY R. FITCH.